Feb. 19, 1935. J. R. HUGHES 1,991,674
COMBINED BUMPER AND WEATHER STRIP FOR AUTOMOBILE DOORS
Filed April 16, 1934
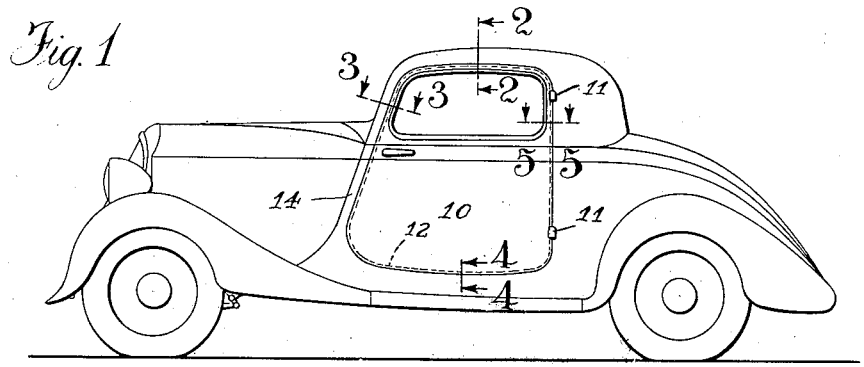
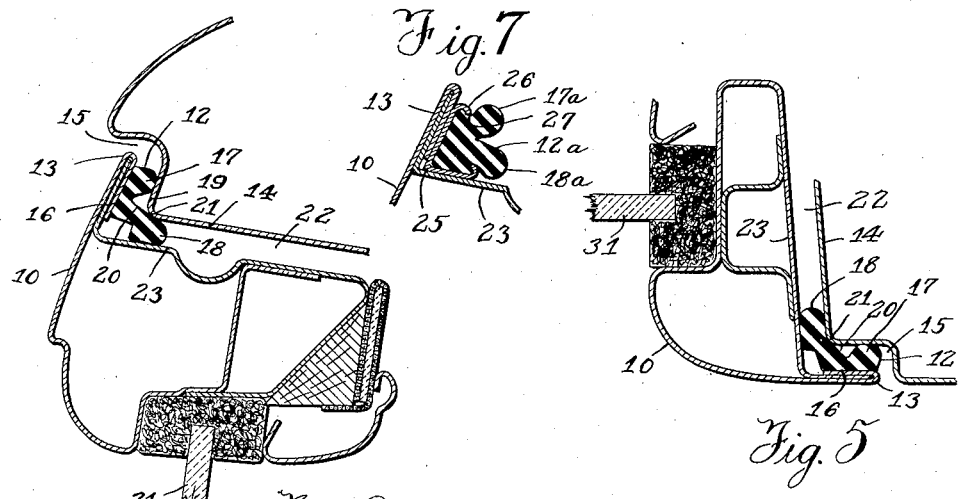
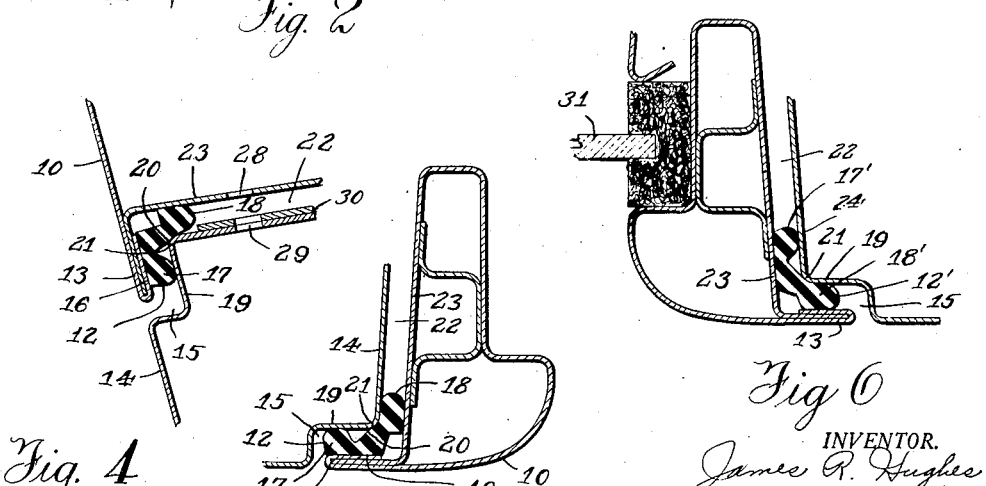

Patented Feb. 19, 1935

1,991,674

UNITED STATES PATENT OFFICE 1,991,674

COMBINED BUMPER AND WEATHER STRIP FOR AUTOMOBILE DOORS

James R. Hughes, South Bend, Ind., assignor to The Atwood Vacuum Machine Company, Rockford, Ill., a copartnership composed of Seth B. Atwood and James T. Atwood Application April 16, 1934, Serial No. 720,783

16 Claims. (Cl. 296—44)

This invention relates to automobile constructions and has particular reference to means for cushioning the closing of the doors and sealing the same against the weather.

Automobile doors have, in the past, relied upon rubber bumper blocks to absorb the shock and jar of closing, but little or no attention was given the matter of weather sealing. At best, some projecting portions of the interior upholstering were relied upon to give some protection from the weather at the joints between the door and the pillars and other parts of the door frame. Obviously, such interior seals aside from giving doubtful benefit for weather protection, afforded no protection whatever against the infiltration of rain or snow into the spaces between the door and frame with the result that the door was apt to freeze in place and make opening difficult, if not impossible. Hence, there is no question as to the advantage of sealing from without rather than from within. It is the principal object of my invention to provide a weather strip of compressible resilient material, preferably sponge rubber, interposed directly between the outer projecting flange of the door and the outer marginal recess in the frame into which the flange projects, the strip being, furthermore, so constructed and proportioned that it serves as a combination bumper and weather strip, serving both to cushion the closing of the door and to seal the same against the weather, from the outside of the joint between the door and frame.

Another object consists in the mounting of the strip on the door rather than on the frame and the forming of the strip generally V-shaped in cross-section so as to contact the frame along two lines, whereby to secure a double seal and distribute the pressures on the strip incident to cushioning the closing of the door, and make for less wear and tear on the strip. I prefer to have the strip so constructed and arranged on the flange of the door that one longitudinal bead of the strip makes substantially right angle contact with the flat bottom of the recess in the frame for the principal cushioning action and incidental sealing, and to have the inclined side of the other longitudinal bead make wiping contact with the edge of the door frame adjacent the recess principally for sealing and incidentally some cushioning. The inclined bead, furthermore, compensates for irregularities at different points on the frame so as to be certain of a continuous seal all around the door.

Another object consists in the provision of novel retaining means for a strip of the character described.

The invention is illustrated in the accompanying drawing, in which—

Figure 1 is a side view of an automobile equipped with door cushioning and sealing means in accordance with my invention;

Figs. 2, 3, 4 and 5 are sections on the correspondingly numbered lines of Figure 1 looking in the directions of the arrows;

Fig. 6 is a section similar to Fig. 5 showing a modification of the application of the strip, and Fig. 7 is a sectional detail corresponding to a portion of Fig. 2 illustrating a retainer for the cushioning and sealing strip.

Similar reference numerals are applied to corresponding parts throughout the views.

The door 10, mounted on the usual hinges 11, is in accordance with my invention provided with a cushioning and sealing strip 12 on the inside of its outwardly projecting marginal flange 13. The flange 13 is on the exterior of the door, and the door frame 14 has a continuous marginal recess 15 to receive this flange so that the outside of the door comes substantially flush with the outside of the body when closed. The flush relationship is preferably maintained at all points except along the top of the door as disclosed in Fig. 2, the body being preferably formed at that point to project outwardly beyond the plane of the outside of the door so as to prevent drainage into the joint between the door and body, without the use of a separate gutter or drip channel otherwise necessitated over the top of the door. The strip 12 will ordinarily be provided all the way around the door but may be provided only in sections and still afford some of the benefits of my invention. The continuity of the strip is indicated in dotted lines in Figure 1 and is clear from Figs. 2–5, taken through the top, front, bottom, and rear edges, respectively, of the door. The strip 12 is preferably of molded sponge rubber, because that material I found has the desired softness and resilience to compress readily for sealing purposes and have the requisite "spring back" for cushioning purposes. Naturally, since this strip extends for such distances as described, thus greatly distributing the force incident to door closing, the cross-section may be reduced to the extent indicated and still give the desired cushioning and sealing action. The strip 12 is cemented, or otherwise suitably secured, at the back thereof to the inside 16 of the flange 13, and is preferably generally V-shaped in cross-section so as to provide two longitudinal beads 17 and 18 for contact with the door frame along two substantially parallel lines. In that way, I obtain a double seal which is more effective from the standpoint of weather protection, and the double contact means further distribution of the force applied to the strip in cushioning the closing of the door, so that there is less likelihood of breaking down the material of the strip. More specifically stated, the bead 17, which is outermost, makes substantially right angle contact with the flat bottom 19 of the recess 15 for the principal cushioning action and incidentally sealing. The other bead 18 has an inclined side face 20 which, in the closing of the door, makes wiping contact with the edge 21 of the door frame adjacent the bottom 19 of the recess, principally for sealing and incidentally for some cushioning action. The inclination of the side of the bead 18 also insures a continuous seal all around the door because even though the joint 22 between the door and frame may not be uniform all around the door, the strip may be placed far enough toward the outer edge of the flange 13 to insure some portion of the inclined face 20 of the bead 18 contacting the edge 21 for sealing purposes. The bead 18 will flex laterally toward the peripheral wall 23 of the door and come into abutment therewith, and in that way not only insure a better seal at 21 but also absorb some of the shock and jar in the closing of the door. The bead 18 must, of course, be sufficiently longer than the bead 17 to reach into the joint 22 between the door and frame as clearly appears in Figs. 2–5.

It should be clear from the foregoing description that I have provided a strip which, in its cushioning action, makes the provision of the ordinary rubber bumper blocks on the door jambs entirely unnecessary, thus avoiding the expense of applying retainers on the pillars or the necessity of cutting into the pillars to form retainer sockets therein. The strip provided in accordance with my invention moreover completely seals the door against the weather, which, of course, is a function lacking in the old style bumpers and which had to be taken care of by some other means and was, as pointed out above, unsatisfactorily taken care of in the past by projecting portions of the interior upholstering. This strip effects a positive seal at the outermost portion of the joint between the door and frame and in that way not only protects the passengers from the drafts but also excludes rain or snow from the joints, which, as pointed out above, was frequently the cause of a door freezing in place and making it difficult, if not impossible, to open the same.

A further advantage of this invention to which attention was not called before is the fact that the compression of the strip between the door and frame, especially at the hinge side of the door, results in making the door tighter than it was ever possible heretofore; that is, the door is not free to rattle, even though the hinges might have sufficient play therein to allow rattling otherwise. The compression of the strip, in other words, takes up any play in the hinges as well as at the lock or latch, and there is accordingly no opportunity for rattling. With door bumpers as heretofore provided, the door would rattle unless some provision were made to place the hinges under constraint, and many accessories for that purpose have appeared on the market.

Still another advantage of the invention to which reference has not been made heretofore, is the fact that the strip not only cushions the closing of the door but deadens the sound of a door closing so that instead of a "tin pan" effect, there is the sound and sense of a heavy composite door closing, even though the door be of light sheet metal construction.

In some constructions, the flange on the door at the hinge side of the door is not wide enough to permit putting on the strip in the manner of Fig. 5, and in that case the strip, as shown at 12' in Fig. 6, is cemented, or otherwise suitably secured, to the peripheral wall 23 of the door with the blunt bead 17' abutting the side of the door frame, as at 24, and the long bead 18' entering the recess 15 to be compressed between the bottom wall 19 of the recess and the flange 13 of the door, while sealing at 21.

The strip, instead of being fastened in place merely by cementing, may, as shown at 12a in Fig. 7, be mounted in a metal retainer strip 25 welded, or otherwise suitably secured, to the door in the angle between the frame 13 and peripheral wall 23. The retainer 25 is of V-shaped cross-section with inturned longitudinal flanges 26 entering the longitudinal grooves 27 provided in the strip 12a alongside the beads 17a and 18a. The strip 12a can be entered in the retainer 25 by entering first the one flange 26 in the one groove 27 and then compressing the strip transversely sufficiently to get the other flange 26 entered in the other groove, after which the expansion of the strip will prevent its coming out. If desired, the strip may, of course, also be cemented to further insure its staying in place in the retainer.

Reverting to Fig. 4, it will be observed that the peripheral wall 23 along the bottom of the door is provided with one or more holes 28 in alignment with holes 29 in the sill 30. This is to allow drainage of any water that may collect in the door if the glass 31 is lowered while it is raining or snowing.

It is believed the foregoing description conveys a good understanding of the objects and advantages of my invention. The appended claims have been drawn with a view to covering all legitimate modifications and adaptations.

I claim:

1. In an automobile door construction comprising a door frame having a jamb portion providing an exteriorly exposed edge, a door bumper and weather strip of resilient, compressible material conformed in cross-section to provide a longitudinal supporting base portion, and two longitudinal bead portions projecting therefrom with their outer edges in laterally spaced relation so as to straddle the edge of the door jamb.

2. In an automobile door construction comprising a door frame having a jamb portion providing an exteriorly exposed edge, a door bumper and weather strip of resilient, compressible material conformed in cross-section to provide a longitudinal supporting base portion, and a shorter compression and a longer flexing bead portion projecting therefrom lengthwise thereof with their outer edges in laterally spaced relation so as to straddle the edge of the door jamb.

3. In an automobile door construction comprising a door frame having a jamb portion providing an exteriorly exposed edge, a door bumper and weather strip of resilient, compressible material conformed in cross-section to provide a longitudinal supporting base portion, a short longitudinal bead portion projecting therefrom substantially at right angles for compression on the vertical face of the door jamb, and another longitudinal bead portion projecting farther therefrom at an acute angle with respect to the short bead to frictionally engage the edge of the door jamb.

4. In an automobile door construction comprising a door frame having a jamb portion providing an exteriorly exposed edge, a door bumper and weather strip of resilient, compressible material conformed in cross-section to provide a longitudinal supporting base portion, a short longitudinal bead portion projecting therefrom substantially at right angles for compression on the vertical face of the door jamb, and another longitudinal bead portion projecting farther therefrom at an acute angle with respect to the short bead to frictionally engage the edge of the door jamb, the outer edge portion of the longer bead being enlarged on the side away from the shorter bead, for the purpose stated.

5. In a door and frame construction, a frame having a jamb portion providing an exteriorly exposed edge, a door having a marginal flange movable toward the outer face of the door frame in closing, and a V-shaped strip of resilient compressible material carried on the flanged portion of the door and providing two longitudinal beads so formed and related to the door flange and frame, whereby one bead is directly compressed between the door flange and the outer face of the door frame, and the other bead has wiping contact with the edge portion of the door frame.

6. In a door and frame construction, a frame having a jamb portion providing an exteriorly exposed edge, a door having a marginal flange movable toward the outer face of the door frame in closing, and having outer peripheral walls disposed in spaced relation to adjacent inner peripheral walls of the frame in the closed position of the door, and a double ribbed strip of resilient compressible material carried on the flanged portion of the door so that one rib is compressed directly by abutment with the outer face of the door frame, and the other rib makes wiping contact with the edge portion of the frame adjacent said outer face, said last mentioned rib being formed to provide an enlarged edge portion arranged to be compressed between the outer peripheral walls of the door and the inner peripheral walls of the door frame.

7. In an automobile body construction having a door hingedly mounted in an opening in the body with ample clearance about the margins of the door, a bumper strip disposed on one of the door and body portions so as to cushion the closing of the door, the said strip having a portion entering and closing the marginal clearance space around the door, whereby to provide a weather seal.

8. In an automobile construction having a door hingedly mounted in an opening in the body with ample clearance about the margins of the door, a bumper strip disposed on one of the door and body portions externally with respect to the body and so as to cushion the closing of the door, the said strip having a portion entering and closing the outer portion of the marginal clearance space around the door, whereby to provide an external weather seal.

9. In an automobile body construction having a door hingedly mounted in an opening in the body with ample clearance about the margins of the door, a bumper strip carried on the door and arranged to engage the body so as to cushion the closing of the door, the bumper strip having a portion arranged to fit in and close the clearance space between the door and body whereby to provide a weather seal.

10. In an automobile body construction having a door hingedly mounted in an opening in the body with ample clearance about the margins of the door, a bumper strip mounted on the door for engagement with an external portion of the body to cushion the closing of the door, the strip having a portion so constructed and arranged to enter and close the outer portion of the clearance space between the door and body whereby to provide an external weather seal.

11. In an automobile construction comprising a door frame having a jamb portion, and a door hinged on the frame having an edge portion movable toward the jamb portion, a door bumper and weather strip on said door of resilient, compressible material conformed in cross-section to provide one longitudinal bead disposed for compression on a surface of said jamb to provide cushioning mainly and incidentally weather sealing, and another longitudinal bead disposed for wiping contact with another surface on said jamb mainly for weather sealing and incidentally cushioning.

12. In an automobile construction comprising relatively hinged door and body portions, the body having a jamb provided thereon and the door having a projecting marginal flange extending around the entire circumference thereof substantially in the plane of the outside of the door movable in the closing of the door toward said jamb, the entire jamb being depressed relative to the plane of the outside of the body to accommodate said flange, and a strip of compressible resilient material mounted directly on the inside of said flange and extending substantially the entire length of the jamb for weather sealing of the door at the outermost portion of the joint between the door and body and for cushioning the door in closing, said strip having engagement with the jamb and being subject to compression between the flange and jamb in the closing of the door, whereby to afford the weather sealing and cushioning functions, the entire jamb being depressed relative to the plane of the outside of the body sufficiently to accommodate the strip and flange so that the outside of the door is substantially flush with the outside of the body in the closed position of the door.

13. In an automobile construction comprising relatively hinged door and body portions, the body having a jamb provided thereon and the door having a projecting marginal flange extending around the entire circumference thereof substantially in the plane of the outside of the door movable in the closing of the door toward said jamb, and a strip of compressible resilient material mounted on one of said door and body portions and extending substantially the entire length thereof for weather sealing of the door at the outermost portion of the joint between the door and body and for cushioning the door in closing, said strip being subject to compression between the flange and jamb in the closing of the door, whereby to afford the weather sealing and cushioning functions, the entire jamb being depressed relative to the plane of the outside of the body sufficiently to accommodate the strip and flange so that the outside of the door is substantially flush with the outside of the body in the closed position of the door.

14. In an automobile construction comprising relatively hinged door and body portions, the body having a jamb provided thereon and the door having a projecting marginal flange substantially in the plane of the outside of the door movable in the closing of the door toward said jamb, and a strip of compressible resilient material mounted on the inside of said flange for weather sealing of the door at the outermost portion of the joint between the door and body and for cushioning the door in closing, said strip having engagement with the jamb and being subject to compression between the flange and jamb in the closing of the door, whereby to afford the weather sealing and cushioning functions, the jamb being depressed relative to the plane of the outside of the body to accommodate the strip and flange so that the outside of the door is substantially flush with the outside of the body in the closed position of the door, the jamb being formed to provide two surfaces in substantially right angled relationship meeting in an exteriorly exposed edge, and said strip being formed and disposed for engagement with both surfaces in the closing of the door.

15. An automobile construction as set forth in claim 13 wherein the body is formed adjacent that portion of the jamb along the top of the door so as to project outwardly beyond the plane of the outside of the door for the purpose described.

16. In an automobile construction comprising relatively hinged door and body portions, the body having a jamb provided thereon and the door having a projecting marginal flange extending around the entire circumference thereof substantially in the plane of the outside of the door movable in the closing of the door toward said jamb, the entire jamb being depressed relative to the plane of the outside of the body to accommodate said flange, and a strip of compressible resilient material carried on the inside of said flange and extending substantially the entire length thereof for weather sealing of the door and for cushioning the door in closing, said strip having a base portion mounted directly on the inside surface of the flange, the base portion being proportioned and disposed so as to cover said flange substantially to the outer edge thereof, the strip having engagement with the jamb and being subject to compression between the flange and jamb in the closing of the door, whereby to afford the weather sealing and cushioning functions, the entire jamb being depressed relative to the plane of the outside of the body sufficiently to accommodate the strip and flange so that the outside of the door is substantially flush with the outside of the body in the closed position of the door.

JAMES R. HUGHES.